US009959885B2

United States Patent
Henrique Barbosa Postal et al.

(10) Patent No.: US 9,959,885 B2
(45) Date of Patent: May 1, 2018

(54) METHOD FOR USER CONTEXT RECOGNITION USING SOUND SIGNATURES

(71) Applicant: SAMSUNG ELECTRÔNICA DA AMAZÔNIA LTDA., Campinas (BR)

(72) Inventors: Antonio Henrique Barbosa Postal, Campinas (BR); Mauricio Struckel Pedrozo Mendes, Campinas (BR)

(73) Assignee: SAMSUNG ELETRÔNICA DA AMAZÔNIA LTDA, Campinas-São Paulo (BR)

( * ) Notice: Subject to any disclaimer, the term of this patent is extended or adjusted under 35 U.S.C. 154(b) by 0 days. days.

(21) Appl. No.: 15/366,586

(22) Filed: Dec. 1, 2016

(65) Prior Publication Data
US 2017/0263266 A1    Sep. 14, 2017

(30) Foreign Application Priority Data

Mar. 8, 2016  (BR) .......................... 10 2016 005135

(51) Int. Cl.
    *G10L 25/51* (2013.01)
    *H04R 29/00* (2006.01)
    *G06F 17/30* (2006.01)
(52) U.S. Cl.
    CPC ........ *G10L 25/51* (2013.01); *G06F 17/30743* (2013.01); *G06F 17/30867* (2013.01); *H04R 29/00* (2013.01)

(58) Field of Classification Search
    CPC ....... G10L 15/02; G10L 15/063; G10L 15/28;
              G10L 17/04; G10L 15/30; G10L 17/00;
              G10L 25/51
    See application file for complete search history.

(56) References Cited

U.S. PATENT DOCUMENTS

| 7,430,510 | B1* | 9/2008 | De Fabbrizio | .......... G10L 15/22 379/70 |
| 7,865,368 | B2 | 1/2011 | Li-Chun Wang et al. | |
| 8,554,559 | B1* | 10/2013 | Aleksic | .................. G10L 15/30 704/235 |
| 8,589,164 | B1* | 11/2013 | Mengibar | ............... G10L 15/06 704/10 |
| 8,688,253 | B2 | 4/2014 | Master et al. | |

(Continued)

*Primary Examiner* — Mohammad Islam
(74) *Attorney, Agent, or Firm* — Staas & Halsey LLP

(57) ABSTRACT

Method for user micro context recognition using sound signatures. The method includes: recording an environment sound sample from a microphone into a mobile device by a trigger stimulus; simultaneous to recording an environment sound sample, collecting hardware and software macro context data from available mobile devices; extracting a sound signature from the recorded sound sample based on sound features and spectrograms; comparing for similar patterns the recorded sound signature with reference sound signatures stored in a sound database; updating the sound database; checking if the recorded sound was recognized; performing a logical association between the sound label and the available macro context data; comparing for similar patterns the recorded context with a reference context stored in a context database; updating the context database; checking if the micro context was recognized; and returning to a mobile context-aware application the micro context label.

10 Claims, 4 Drawing Sheets

(56) References Cited

U.S. PATENT DOCUMENTS

| | | | |
|---|---|---|---|
| 2002/0178003 A1* | 11/2002 | Gehrke | G10L 15/30 704/246 |
| 2006/0241916 A1* | 10/2006 | Sieracki | G10L 25/00 702/19 |
| 2007/0185718 A1* | 8/2007 | Di Mambro | G06F 21/32 704/273 |
| 2011/0055256 A1* | 3/2011 | Phillips | G10L 15/30 707/769 |
| 2012/0224706 A1 | 9/2012 | Hwang et al. | |
| 2015/0066495 A1* | 3/2015 | Zhang | G10L 15/02 704/231 |
| 2016/0048667 A1* | 2/2016 | Kao | G06F 21/32 726/19 |
| 2016/0217793 A1* | 7/2016 | Gorodetski | G10L 17/04 |
| 2016/0302008 A1* | 10/2016 | Oishi | H04R 3/04 |
| 2017/0212723 A1* | 7/2017 | Atarot | G06F 3/167 |

* cited by examiner

METHOD FOR USER CONTEXT RECOGNITION USING SOUND SIGNATURES

CROSS-REFERENCE TO RELATED APPLICATION

This application claims the benefit of Brazilian Patent Application No. 10 2016 005135 5, filed on Mar. 8, 2016 in the Brazilian Intellectual Property Office, the disclosure of which is incorporated herein by reference.

FIELD OF THE INVENTION

The present invention refers to a method for user context recognition (context awareness) using sound signatures. Specifically, the present invention refers to a method for recognition of a detailed user context based on environment sound signatures, wherein a sound signature is extracted from an environment sound sample and logically associated with "macro context" data collected from the prior art—context data available by means of hardware or software—aiming to determine a more specific and detailed context level, hereinafter called "micro context".

BACKGROUND OF THE INVENTION

Context awareness is widely used for mobile solutions which take advantage of information provided by hardware and software available context data, such as mobile device sensors and user's personal information. Hardware and Software available context data are frequently combined in the prior art and they are herein called "Macro context". Google Now, Google on Tap and Apple Siri are some examples of popular context-aware applications.

Other well-developed prior art technology referred in the present invention is the sound pattern recognition. Services such as Shazam and Sound Hound are able to use short sound samples which can be filtered to perform searches in commercial music recordings databases, allowing users to identify a specific music being played in the radio or ambient.

The present invention proposes that a "sound signature", representing sound feature also known as "sound features", and spectrograms be extracted from audible or inaudible sound environment, such as background noise using similar sound recognition technology and that sound signature be logically associated with the prior art macro context information in order to determine a more detailed and refined level of context, herein called "micro context". Further, a specific micro context can be recognized from reference context database 433 containing labeled micro context entries, by detecting data patterns and regularities. Moreover, that sound and context information can be shared among several different users, allowing richer reference databases and inferences among different users. In addition to data pattern recognition based on existing reference data, also unknown sound signatures and respective micro contexts can be discovered by using unsupervised or semi-supervised learning approaches, and be added to those sound reference databases (sound fingerprint DB). User inputs on regular reports may also be used to support that process of learning new sounds and respective micro contexts. As a result, automatically, mobile device context-aware applications will be able to behave differently according to specific user's micro contexts.

In the classic definition, context awareness is a property of mobile devices that is defined complementarily to "location awareness" and basically provides information about where the user is. The micro context recognition process takes advantage of the prior art macro context information, but by logically associating this macro context with the sound signatures and by detecting patterns and regularities from historical contextual reference information, from this and other users, the present invention allows a deeper level of details about the user context, so that a mobile context-aware application is able to react to what user is doing, how he is doing, where he is in more details (e.g. which meeting room, car, room in the house), what is happening around, who is around or with him.

The sound recognition and micro context recognition processes uses pattern recognition techniques, a branch of machine learning that focuses on the recognition of patterns and regularities in data. Pattern recognition is the assignment of a label to a given input value. Pattern recognition systems are in many cases trained from labeled "training" data (supervised learning), but when no labeled data is available other algorithms can be used to discover previously unknown patterns (unsupervised learning). Therefore, it is also possible discovering new patterns from originally unknown sound signatures and micro context patterns, even if historical reference data is not initially available.

Furthermore, it is possible to discover (and later recognize) a micro context even if the sound cannot be initially identified, even an initially unknown sound, represented by a new discovered sound label may be used as input for the micro context recognition process. Discovered sound and context labels are saved, or "learned", for further pattern recognition, according to unsupervised learning approaches. The effect is "I don't know what sound is this, but I frequently hear it when I am at a certain place/at a certain day or time/doing something/with someone/using something".

A special application of the present invention is the possibility of an external speakerphone being deliberately emitting an inaudible synthetic sound sample in a specific environment, in order to emulate new micro contexts. This approach can enable commercial applications, such as tracking visitor's profiles versus specific business locations (a store, a gas station, etc.) and detecting customer's preferences.

EXAMPLES AND USE CASES (1) Beyond location awareness: classic context-aware application can identify the user's macro context from, for example, the GPS measurements and/or the user's calendar events and providing location-based information while he is driving home. Beyond that, by applying the present invention, the context-aware application can collect short samples of environment sound, extract a sound signature and, for example, recognize from the engine sound if user is taking a bus, a train, driving a bicycle, a motorcycle, or even a specific car. The recognized micro context allows the definition of richer and more detailed user cases. For example, the application may be able to determine if the user is driving a car and would take a related action such as presenting alternate driving route options. Otherwise, if user is taking a bus or train, application could suggest the user entertainment options to watch while he is traveling home. Else, if user is riding a bicycle, application could also consider shorter bicycle paths as route options.

Discovering unknown sounds and micro contexts: system detects a peculiar sound background in a particular meeting room, which may include outdoor sound of cars, birds, etc., the noise of electric "appliances" even if not completely identified (e.g. the sound of air conditioning engine or air ducts) and/or the reverberation (echo) of specific voices to the geometry of that room. Pattern recognition unsupervised or semi-supervised learning approaches allow discovering previously unknown patterns. It is then possible to recognize a micro context including where user is and which activity he might be doing at that time, which other users use to be in the same place or to attend same meeting. A context report with daily or weekly activities (e.g. "How was my day/week") may eventually be provided, so user can assist the semi-supervised learning process.

(3) Recognizing a micro context from other user's data: the invention allows that sound and related micro context be shared among this and other users. Besides allowing more accurate context detection from a larger data sets, new contexts may be inferred: two or more people may be subject to the same context, for example—users may have been in the same specific place, used the same car, done similar activities, and maybe together.

(4) Emitting synthetic sound sample in a specific environment: Stores in a shopping center mall have been equipped with external speakerphones which emits specific inaudible sound patterns, yet detectable by phone microphones, e.g. 25 KHz. That information is used by a mobile application to detect if the user is shopping and which store he is visiting, even which section in a supermarket, or which area of the shopping center he is in. In contrast, if user privacy settings allows, big stores chains may install those speakerphones systems in many of its stores, and will be able to collect qualitative and quantitative anonymous information about its visitors such as age, gender, preferences, in order to target more specific marketing campaigns per area or store location.

These are some other examples of sound signatures which may be used to specialize micro contexts from prior art macro contexts:

Specific human voice tones;

Different methods of transportation: bus, train, bicycle, motorcycle, car, truck, boat;

Specific engine sounds;

Different person's sounds on specific situations: sleeping (snoring), running, walking;

Typical noises in different areas at home or office (e.g. mumbling, keyboard typing);

Specific sound reverberations (echoes) at different environments or specific rooms;

Different noises of office and home appliances: coffee machine, air conditioning, refrigerator, washing machine, TV set; and Short, one-time sounds, related to one time event: gate opening, car breaking, car crashing, firearm shot.

DESCRIPTION OF THE RELATED ART

The patent document US 2012/224706, titled "System and Method for Recognizing Environmental Sound", filed on Oct. 31, 2011, by Qualcomm Inc, discloses a method for recognizing environmental sound based on a client device with a client database and a server, by using labels and confidence levels to evaluate sound similarities. The present invention differs from document US 2012/224706 because it aims to recognize very specific user contexts, and it goes beyond recognizing specific environment sounds.

The present invention aims to logically associate sound signatures with contextual data from hardware (e.g. sensors measurements) and software (e.g. user's personal data) in order to determine a "micro context", which is a more detailed level of context than classic prior art context-aware applications, and then recognize/discover patterns and regularities by comparing the sample against a sound database containing trained reference data, or "sound reference" (sound fingerprints). The present invention includes learning from new sound signatures and its respective micro contexts even if initially unknown sound signatures are not initially available in the sound database. Besides using pattern recognition techniques with supervised learning approaches based on existing trained reference data, the present invention can also discover new sound signatures and respective micro contexts by using unsupervised or semi-supervised learning approaches. The effect sounds like "I don't know what sound is this, but I use to hear it when/with/where/within a certain context".

The patent document KR 20140074129, titled: "Place Recognizing Device and Method for Providing Context Awareness Service", filed on Dec. 7, 2012, by Samsung Electronics, presents an apparatus and method for recognizing places based on the identification of sound or images samples collected using a mobile device's microphone or camera and extracting relevant features from those samples. The present invention differs from document KR 20140074129 because it goes beyond the location awareness based on sound and images samples basically determining where user is but, by combining prior art with relevant hardware and software available context data with the sound signatures, it can also infer what user is doing, how he is doing, where he is in more details (e.g. which meeting room, car, room in the house), what is happening around, whom he is with. The proposed method also combines other relevant hardware and software available context data with sound signatures creating micro contexts and it can compare it with patterns stored in a historical context database containing reference micro contexts from this and other users. Besides using pattern recognition techniques with supervised learning approaches based on existing trained reference data, the present invention can also discover new sound signatures and the respective micro contexts by using unsupervised or semi-supervised learning approaches.

The U.S. Pat. No. 7,865,368 titled: "System and Methods for Recognizing Sound and Music Signals in High Noise and Distortion", filed on Mar. 14, 2008, by Landmark, LLC, describes the technology used by the popular music identifier application for song identification, "Shazam", which uses sound samples references based on sound features and reference time points to recognize and retrieve sound or music information from a database. The algorithm is resistant to background noise, sound distortions and compression. The present invention differs from document U.S. Pat. No. 7,865,368 because it focuses essentially on the micro context recognition process while document U.S. Pat. No. 7,865,368 focuses on the sound signatures extractions aspects and recognition process based on existing reference music data. Besides that, even if a sound signature is initially unknown, that is, there is no available labeled reference data in the sound reference database, the present invention can discover (and later recognize) new sound signatures and respective micro contexts. Besides using pattern recognition techniques with supervised learning approaches based on existing trained reference data, the present invention can also discover new sound signatures and respective micro contexts by using unsupervised or semi-supervised learning approaches.

The U.S. Pat. No. 8,688,253 titled: "Systems and Methods for Sound Recognition", filed on May 24, 2012, by Sound-Hound, Inc, discloses systems and methods for sound recognition, more specialized on song identification. It uses a music database placed in the device and in one or more remote music databases (DBs) specific for singing, humming sounds, recorded music and speech and uses specific music feature extractors for each of them. The present invention differs from document U.S. Pat. No. 8,688,253 because it focuses essentially on the user micro context recognition process while document U.S. Pat. No. 8,688,253 focuses on the sound extraction process and the recognition process based on existing reference music data. Even if a sound cannot be specifically identified, the present invention may recognize a micro context based on the rough sound signature (i.e. extracted sound features and sound spectrogram).

The paper titled "Scalable Sound Sensing for People-Centric Applications on Mobile Phones", by Hong Lu, et al, presents SoundSense framework for recognizing meaningful sound events that occurs on user daily lives. SoundSense runs solely on the mobile phone with no back-end interactions and it is designed to work on resource-limited phones. The present invention differs from the content of this paper because it considers contextual data from hardware (sensors) and software (e.g. user's personal data) and their logical association with a sound signature to determine a "micro context" while SoundSense applications relies only on sound identification. As a result, the invention is not limited to infer where user is based just on sound/image signature samples matching, but in can also infer what user is doing, how he is doing, where he is in more details, what is happening around, whom the user is with. Even if the sound signature cannot be initially recognized, the present invention may discover (and later recognize) by labeling new sound signatures and respective micro contexts. Effect is "I don't know what sound is this, but I use to hear it when/with/where/within a certain context". The present invention also differs from this paper because it considers contextual information from shared sound and context databases containing other user's reference sound and micro contexts, while the content on the paper relies on a local database containing information about this user, only; as a result the present invention can perform richer sound and contextual inferences among different users and using a larger database.

The method of the present invention allows the creation and recognition of a more detailed level of user context, the micro context, based on a sound signature. After a sound sample's features and spectrograms be extracted from a short sound sample—as per the prior art sound recognition—the method of the present invention maintains the logical association between that sound signature and the prior art context (the macro context) information and uses it for pattern recognition against trained data in a Sound database and in a context database.

The recognized micro context may then be used to create smarter context-aware applications than the classic macro context awareness.

Even if a sound signature or a micro context is initially unknown, or no trained data is available in sound and context databases, the method can discover new sound signatures and related micro contexts.

Context Awareness Technologies

Context awareness is a property of mobile devices that is defined complementarily to location awareness. Whereas location may determine how certain processes in a device operate, context may be applied more flexibly with mobile users, especially with users of smartphones.

Google Corporation, for example, uses a range of their internet services to capture user's preferences and contextual information by binding all the users' inputs into an advertisement suggestion engine. The product Google Now provided by Google attempts to anticipate user needs and may provide to the users warnings and reminders according to their context. Google Now on Tap can assist user on what he is doing, getting relevant information instantaneously about the screen or application is currently looking at or using, at the moment. Google's solutions does not use sound signature pattern recognition into their context awareness solutions, they rely on user input data captured from their platform services and mobile operational system inputs.

Sound Recognition Technologies:

Waze or Twist or Move mobile applications are limited to the geo-location data provided by the GPS sensors present into the mobile devices, and use this information more into the car driving context.

The Shazam and Sound Hound applications for music identification: recognizing a sound signature and matching these patterns into a sound database. Both the sample data and the data in the sound reference database (sound fingerprint database) relies on spectrograms comparison (Shazam) or extracted sound "features" matching (Sound Hound). Spectrogram is a visual representation of the spectrum of frequencies in a sound as they vary with time or some other variable. Sound Hound application may even recognize sung or hummed music.

Sound features could be extracted from audible or inaudible sounds. Some commercial microphones are able to detect and record inaudible sounds, such as ultrasounds from the nature (e.g. 48 kHz, within the range of many ultrasonic bats and insects). Ultrasounds are considered as being sounds that occur above the range of human hearing, which is generally defined as 20 Hz to 20 kHz. However, most adults cannot hear above 15 kHz.

Pattern Recognition and Machine Learning Technologies

Pattern recognition is a branch of machine learning that focuses on the recognition of patterns and regularities in data. In machine learning, pattern recognition is the assignment of a label to a given input value.

An example of pattern recognition is classification, which attempts to assign each input value to one of a given set of classes (for example, determine whether a given e-mail is "spam" or "non-spam").

Pattern recognition systems are in many cases trained from labeled "training" data (supervised learning), but when no labeled data are available other algorithms can be used to discover previously unknown patterns (unsupervised learning). The latest approach allows discovering and recognizing new sound and micro context patterns, which were previously unknown.

Supervised learning assumes that a set of training data (the training set) has been provided, consisting of a set of instances that have been properly labeled by hand with the correct output. This is the case in which a known sound signature is already labeled in the sound database (e.g. Shazam or Sound Hound) or a known micro context is already labeled in the context database.

Unsupervised learning, on the other hand, assumes training data that has not been hand-labeled, and attempts to find inherent patterns in the data that can then be used to determine the correct output value for new data instances. Note that in cases of unsupervised learning, there may be no training data at all to speak of; in other words, the data to be labeled is the training data.

Unsupervised approaches allow the possibility of handling sounds which references were not initially hand-labeled. New sound references, and respective labels may be discovered and added during the learning process. Using strictly this approach, it is possible that sound and context databases might be even empty, at the beginning.

Approaches to unsupervised learning include clustering and some neural network models: self-organizing map and adaptive resonance theory.

A combination of the supervised and unsupervised learning approaches is semi-supervised learning, which uses a combination of labeled and unlabeled data (typically, a small set of labeled data combined with a large amount of unlabeled data). This is the case, for example, there is initially a limited amount of reference data: labeled sounds in the sound reference database (sound fingerprint database) or labeled micro contexts in context database are available, and new references can be discovered during the learning process.

SUMMARY OF THE INVENTION

The method for recognizing a detailed user context based on environment sound signatures is disclosed wherein a sound signature is extracted from environment sound sample and logically associated with collected prior art macro context data—software and hardware available context data—in order to determine a more specific and refined level of context, herein called micro context. Further, a micro context detected by a mobile device is recognized by detecting data patterns and regularities from reference data in context database containing labeled micro contexts, using supervised learning approaches. In addition, those sound and context information are shared among different users, increasing sound and context databases and providing richer references among different users. In addition to the data pattern recognition based on existing reference data, also previously unknown sound signatures and respective micro contexts can be discovered by using unsupervised or semi-supervised learning approaches, and be added to those reference databases.

Therefore, the present invention achieves the above mentioned objects through a method for user micro context recognition using sound signatures comprising the steps of:

recording an environment sound sample from a microphone into a mobile device by means of a trigger stimulus;

simultaneous to the step of recording an environment sound sample, collecting hardware and software macro context data from the available mobile devices;

extracting a sound signature from the recorded sound sample;

performing a comparison between the recorded sound signature and the reference sound signature stored in a sound database;

updating the sound database if the recorded sound signature is not found;

checking if the recorded sound was recognized and, in positive case, using recognized sound label as input, and in negative case, using the new sound label discovered as input;

performing a logical association between the sound label and the available macro context data;

performing a comparison between the recorded context and a reference context stored in a context database;

updating the context database if the recorded context is not found;

checking if the micro context was recognized and, in positive case, setting the result as recognized micro context label, and in negative case, setting the result as new micro context discovered; and returning the micro context label result.

A system that is able to implement the method of the present invention is composed of a mobile device which, upon a trigger stimulus, records a sound sample together with its hardware and software macro context information and it send them for processing over the "cloud", for example to a remote server connected through the Internet. As a result, a specific micro context label is recognized and related information is returned to the mobile device context-aware applications, which can execute different actions according to the provided detailed micro context information, automatically adjusting its behavior.

In a specific business embodiment, an external speakerphone deliberately emits an inaudible synthetic sound pattern sample in specific environments, creating synthetic sound signatures and new micro contexts. A commercial contextual application may, for example, track visitor's profiles versus specific business locations and detect visitor's preferences.

BRIEF DESCRIPTION OF FIGURES

The objectives and advantages of the present invention will become clearer through the following detailed description of an example and non-limitative embodiment together with the attached figures, wherein.

DETAILED DESCRIPTION OF THE INVENTION

Figure 1:
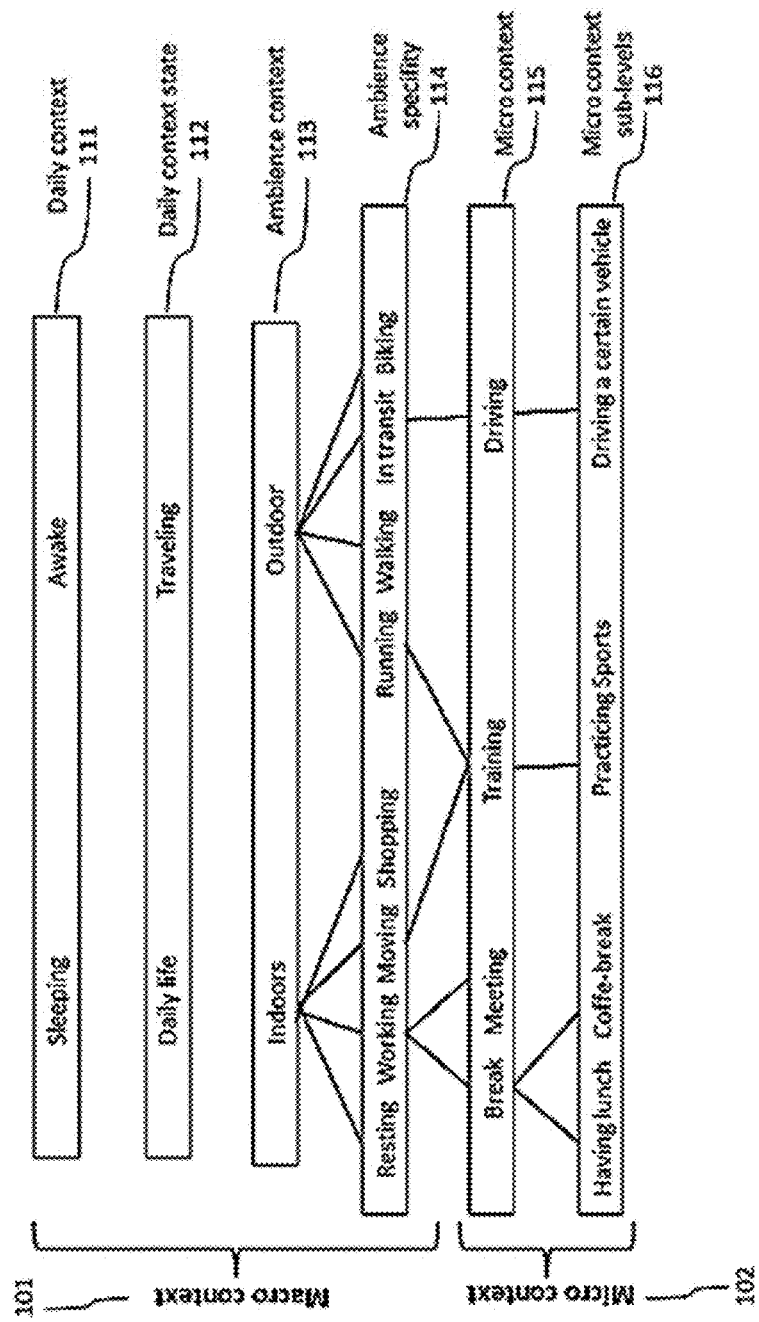
FIG. 1 discloses an example of context categories, such as macro and micro context levels.

FIG. 1 shows examples of macro contexts 101 levels break-up in more detailed levels of details, as per prior art. It also introduces some micro contexts 102 examples and shows how the macro contexts may be broken in even more specific levels of details by taking advantage of sound signatures, the logical associations between sound signatures and macro context information and by detecting historical patterns and regularities of those associations.

Among the macro context 101 examples that may be broken, there are daily context 111 (user sleeping or awaken state), a daily context state 112 (daily or on travel), an environment context 113 (internal or external environment) and an environment specification 114 (resting, working, moving or shopping at an internal environment or running, walking, driving or riding a bicycle at an external environment).

In turn, a micro context example 115 would be a lunch time or meeting from a single macro context 101 environment specification 114 (working). Other example would be a training state from different environment specifications 114 (moving at inner environment or running at external environment). Or else a single micro context 115 (driving) originated from a single macro context 101 environment specification 114 (at traffic).

FIG. 1 also shows micro context sub-levels 116 (lunch or breakfast from a lunch micro context state 115, or practicing sports from a micro context training state 115 or driving a certain vehicle from a micro context driving state 115 which are more specific information of the micro contexts 115.

Figure 2:
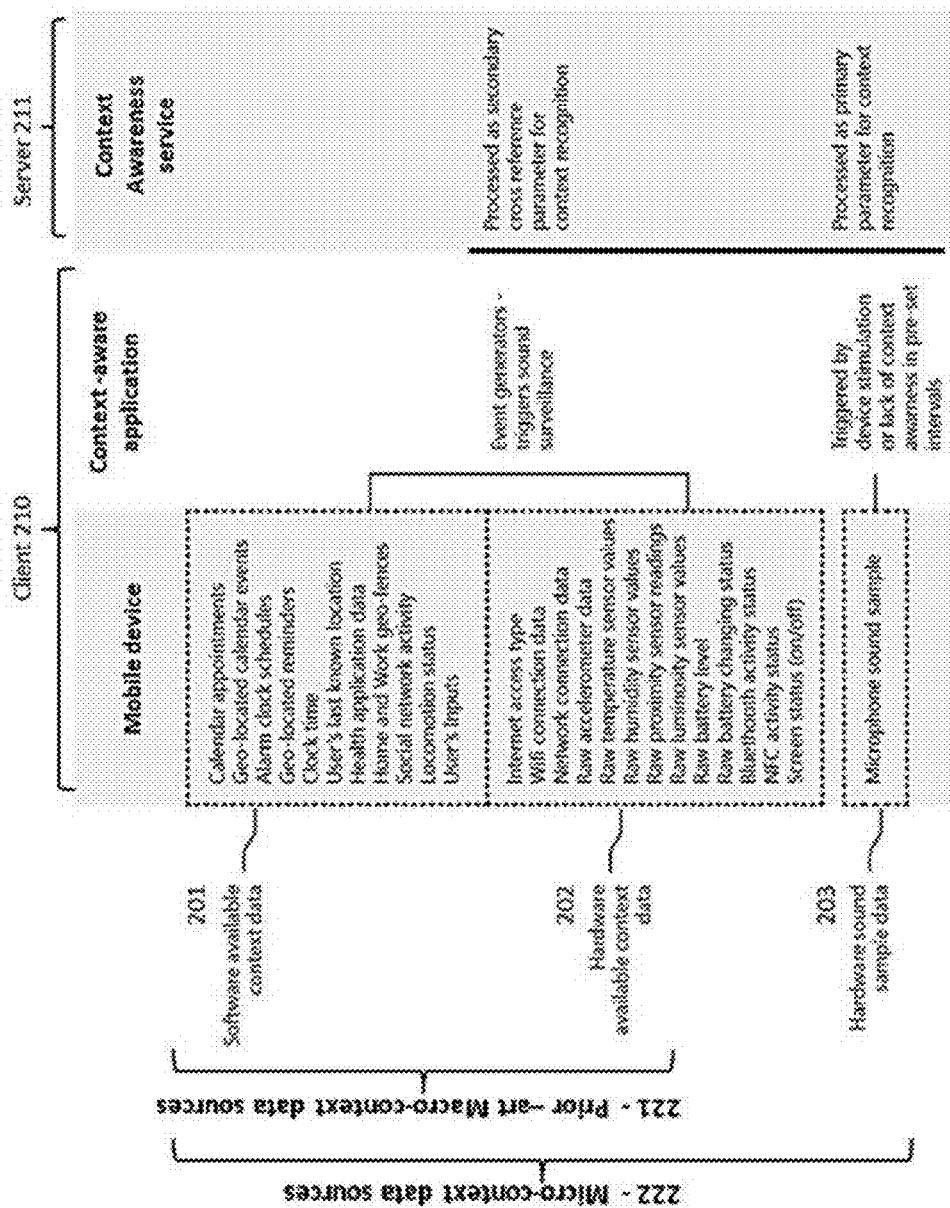
FIG. 2 discloses the examples of context data sources (hardware and software) and the triggering process.

FIG. 2 shows examples of context data sources. The macro context information 221 includes software available context data 201 and hardware available context data 202. In order to determine a deeper level of details—the micro context 222—context sound signatures are associated, extracted from sample sound data collected by the device's microphone 203. FIG. 2 also discloses the trigger stimulus events used by the context-aware application executing in the client 210 to trigger the recognition process represented in FIG. 4, described below. A server 211 executes a context recognition service which processes hardware sound sample data 203 as preliminary parameters for context recognition and available context data by software 201 or hardware 202 as secondary parameters.

Figure 3:
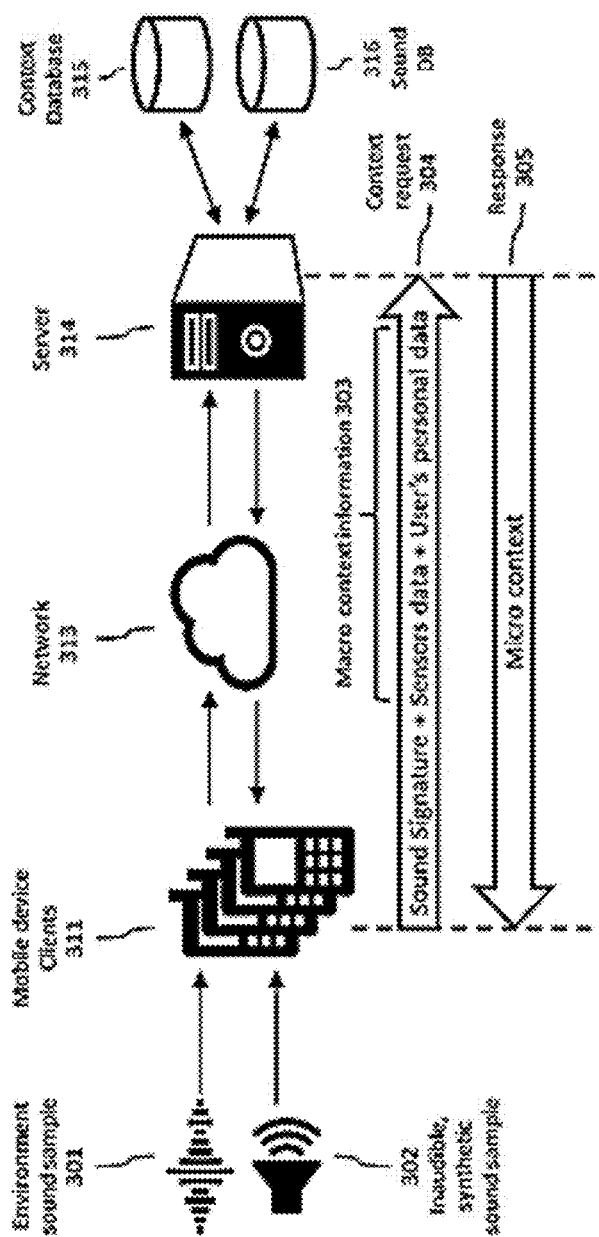
FIG. 3 describes the system infrastructure that performs the method of the present invention.

FIG. 3 describes the System Infrastructure consisting of one or more mobile devices, usually mobile phones 311 equipped with sensors and a microphone able to collect short samples of the environment sound 301, running a client context-aware application connected to server 314. Clients can access the server through the network or "cloud" 313 using Internet protocols or other connectivity methods thru Wi-Fi or Mobile networks (3G, 4G, etc.). Both audible and inaudible environment sounds can be collected and processed. Upon trigger stimulus, the context-aware application sends a context request message to the remote Server. The Trigger stimulus events include:

Hardware device's sensors relevant changes, e.g. sensors values changes;

Software context data changes, e.g. user's personal data updates;

Environment sound stimulus 301 captured by the microphone;

Inaudible, synthetic sound 302 which may be injected by an external speakerphone and captured by the phone microphone; and Predefined times (periodic or at preset times).

After triggered by stimulus events above, the mobile device client 311 can send to the server a context request message 304 containing the prior art macro context information 303 (e.g. sensors data and user's personal data), together with a sound sample 304.

The server 314 can extract a sound signature from the sound sample and it can recognize a micro context using reference data stored in the optional sound database 316 and the context database 315, returning the detected micro context as a response message back to that client. Then, the context-aware application running in the client may consider the recognized detailed micro context to define its execution flow.

Pattern recognition techniques are used for detecting patterns and regularities in sound signatures and micro context data. That is achieved by classifying them, or by assigning a label to each instance.

In a specific embodiment on business area, a predefined inaudible sound pattern 302 containing a specific signature provided by a business partner can be deliberately emitted in specific business locations by an external speakerphone. Therefore, the system will be able to correlate visitor's user profiles and sensors data with physical spaces. That correlation may be used to identify costumer preferences and/or use the signal capture as a presence confirmation statistics that could be provided anonymously.

Figure 4:
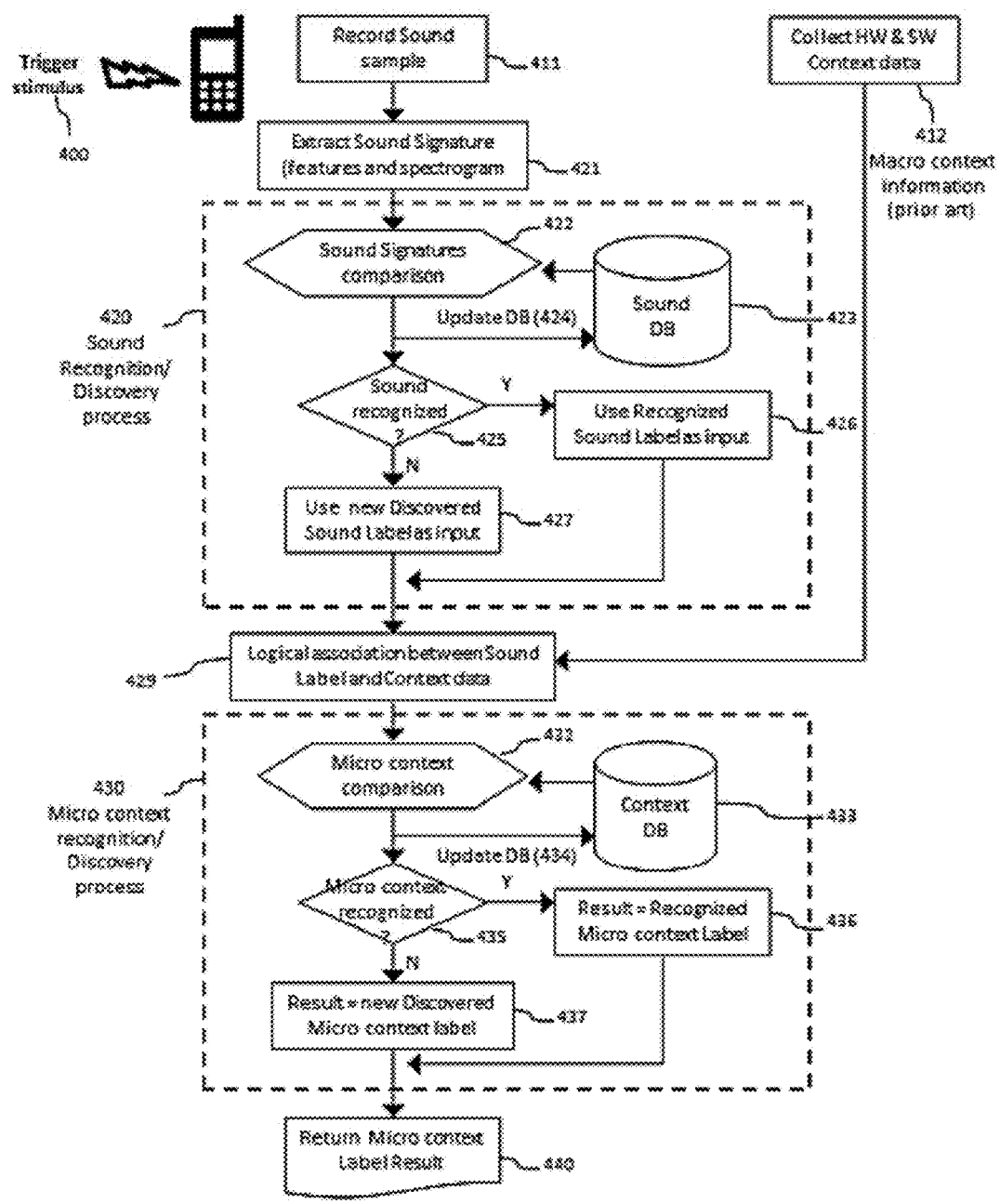
FIG. 4 describes the steps of the method for micro context recognition of the present invention.

FIG. 4 describes the micro context recognition method that takes place in the mobile device client 311 and in the server 314 sides. The method steps comprise:

Upon trigger stimulus 400, the context-aware application in the mobile device client records a sound data sample 411 from the environment, collects prior art hardware and software context data 412 and sends that information as part of a context request message 304 to the server. A Sound signature 421 is extracted from the sound sample recorded by the client, using prior art techniques: extracting sound features and spectrograms.

Sound recognition/discovery process 420: sound signatures comparison 422 will attempt to recognize the collected sound signature against labeled training data sound signatures stored in the sound database 423. As per prior art, the sound signatures stored in sound database and the sound signatures extracted from the sound samples are subject to the same sound features and spectrogram extraction algorithm, before they can be compared. If sound signature is recognized 425, the recognized sound label is used as an input 426 for the next micro context recognition process 430; otherwise no training data are available in sound database and other algorithms can be used to discover previously unknown patterns (unsupervised learning) and a new discovered sound label be used as input 427. Unsupervised learning approaches allow the possibility of handling sounds which references were not initially hand-labeled. New sound references, and respective labels may be discovered and added during the learning process, and the sound database is kept updated 424 during the training and learning process.

As per sound recognition prior art (which did not include sound discovery), both the sample data collected by the mobile device and the existing data in the reference sound database 423 must be subject to the same features and spectrogram extraction algorithm.

Logical association between sound label and macro context data 429: the discovered or recognized sound label is logically associated to the macro context information 412 (hardware and software context data) wherein this association specifies a micro context. Logically, it is possible that a sound label is associated to one or more (m) macro context as well as it is also possible that a macro context be associated to one or more (n) sound labels. Therefore, micro context defines a logical "m-to-n" relationship between the sound label and macro context, so that it is possible a context-aware mobile application to query and take decisions based on which contexts a sound has been recognized, and which sounds have been recognized in a given context.

Micro context recognition/discovery process 430: the micro context, the logical association 429 between the sound label and the macro context information will be compared 432 with historical information stored in the in context database 433, discovering and recognizing patterns and regularities, similarly the previous sound recognition process. In case of matching 435—successful classification—a response message containing a recognized micro context label 436 will be returned back to the context-aware application, which will take advantage of a detailed level of context, otherwise no context training data are available in context database and other algorithms can be used to discover previously unknown patterns (unsupervised learning) and a new discovered micro context label result will be returned to the device 437. Similarly, unsupervised approaches allow the possibility of handling context info which references were not initially hand-labeled. New context references, and respective labels may be discovered and added during the learning process, and the context database will be kept updated with new or existing instances of sound signatures and their logical associations with the macro context information, as well as micro context comparison results update 434 the historical information in the context database for training and learning purpose. In this process, the micro context reference information from this and other users can be used for increased accuracy based on a larger amount of context data available and the contextual relationship among users. The data must be provided under user's agreement and in such a way user's privacy is preserved. In case user does not agree to share his data, he might not take advantage of this benefit.

Return micro context label and associated information as a result 440: the client's context aware application then reacts accordingly to the returned micro context information.

By using pattern recognition techniques, supervised learning and/or unsupervised learning, it is also possible discovering (and later recognizing) new patterns from originally unknown sound signatures and micro context patterns, even if reference labeled data are not available. In addition, is possible to discover a new micro context event if the sound label is not originally available in the sound database; the effect is like "I cannot identify exactly what sound is this, but I use to hear it when I am at a certain place/at a certain day or time/doing something/with someone/using something".

After a period of usage, the system starts associating the sound signatures for different user contexts, being able to register context patterns. For instance, the system will "learn" the background noise sound and related micro context, for a user specific car engine, a background noise for the cafeteria at the office, when the user is sleeping at home or sun bathing by the pool. This way the service will categorize those patterns within a preset of human behavior and contexts, to learn, for instance, which sounds are related to work, leisure, driving a car, riding a bike or just the context of short break at work.

The micro context recognition process 430 can take advantage of sound and context reference data from other users, so that micro context recognition process will be more accurate and richer based on contextual data from different people, and based on a larger mass of data. The classified micro context will feedback the context database for training and learning purposes, and that information may be used by this and/or other users which might be exposed to a similar context.

Some user-feedback could be eventually provided to the system, in the format of a daily or periodic context report, herein referred as "How was my day" report, which is an opportunity for the user to assist the system by hand-labeling sound and context instances in a semi-supervised learning approach with more accurate, labeled, reference data being stored in the context database 423 and sound database 433.

Although the present invention has been described in connection with certain preferred embodiment, it should be understood that it is not intended to limit the invention to those particular embodiment. Rather, it is intended to cover all alternatives, modifications and equivalents possible within the spirit and scope of the invention as defined by the appended claims.

The invention claimed is:

1. A method for user micro context recognition using sound signatures, the method comprising:

recording, using a mobile device, a sound sample received by a microphone of the mobile device based on a trigger stimulus;

collecting available hardware and software macro context data from the mobile device during the recording the sound sample;

extracting, by at least one processor, a sound signature from the recorded sound sample;

performing a sound comparison of the extracted sound signature to reference sound signatures stored in a sound database;

checking, based on the sound comparison, whether the extracted sound signature was recognized in the sound database, and either using the recognized sound signature as an input or using the extracted sound signature as the input and updating the sound database with the extracted sound signature;

performing a logical association between the input and the collected macro context data as micro context;

performing a context comparison between the micro context and a reference context stored in a context database;

checking, based on the context comparison, whether the micro context was recognized in the context database, and either setting the recognized micro context as a result or setting the micro context as the result and updating the context database with the micro context;

providing the result to a context-aware application in the mobile device such that the application uses the result during an execution of the application.

2. The method according to claim 1, wherein the extracted sound signature comprises features of at least one of an audible and inaudible sound sample recorded in an environment of the mobile device.

3. The method according to claim 1, wherein the trigger stimulus includes at least one of a change in a hardware sensor, a change in software data, and a preset time.

4. The method according to claim 1, wherein the reference sound signatures are previously recorded in the sound database, are automatically recognized using supervised learning, and are automatically discovered using unsupervised learning.

5. The method according to claim 1, wherein the reference context is previously recorded in the context database, is automatically recognized using supervised learning, and is automatically discovered using unsupervised learning.

6. The method according to claim 1, wherein the updating the context database comprises at least one of a supervised learning method, an unsupervised learning method, and a semi-supervised learning method.

7. The method according to claim 1, wherein the reference sound signatures stored in the sound database and the reference context stored in the context database are shared with other mobile devices.

8. The method according to claim 1, wherein the recorded sound sample includes at least one of a natural environmental sound and an artificial sound inaudible to humans and matching a reference sound signature stored in the sound database that is intentionally issued by an external speaker separate from the mobile device, where the artificial sound is produced for context-awareness for a particular location.

9. A non-transitory computer-readable recording medium storing a program to implement a method comprising:

recording, using a mobile device, a sound sample received by a microphone of the mobile device based on a trigger stimulus;

collecting available hardware and software macro context data from the mobile device during the recording the sound sample;
extracting, by at least one processor, a sound signature from the recorded sound sample;
performing a sound comparison of the extracted sound signature to reference sound signatures stored in a sound database;
checking, based on the sound comparison, whether the extracted sound signature was recognized in the sound database, and either using the recognized sound signature as an input or using the extracted sound signature as the input and updating the sound database with the extracted sound signature;
performing a logical association between the input and the collected macro context data as micro context;
performing a context comparison between the micro context and a reference context stored in a context database;
checking, based on the context comparison, whether the micro context was recognized in the context database, and either setting the recognized micro context as a result or setting the micro context as the result and updating the context database with the micro context;
providing the result to a context-aware application in the mobile device such that the application uses the result during an execution of the application.

10. An apparatus comprising:
at least one memory configured to store instructions; and
at least one processor configured to execute the stored instructions to implement a method comprising:
recording, using a mobile device, a sound sample received by a microphone of the mobile device based on a trigger stimulus;
collecting available hardware and software macro context data from the mobile device during the recording the sound sample;
extracting, by the at least one processor, a sound signature from the recorded sound sample;
performing a sound comparison of the extracted sound signature to reference sound signatures stored in a sound database;
checking, based on the sound comparison, whether the extracted sound signature was recognized in the sound database, and either using the recognized sound signature as an input or using the extracted sound signature as the input and updating the sound database with the extracted sound signature;
performing a logical association between the input and the collected macro context data as micro context;
performing a context comparison between the micro context and a reference context stored in a context database;
checking, based on the context comparison, whether the micro context was recognized in the context database, and either setting the recognized micro context as a result or setting the micro context as the result and updating the context database with the micro context;
providing the result to a context-aware application in the mobile device such that the application uses the result during an execution of the application.

\* \* \* \* \*

UNITED STATES PATENT AND TRADEMARK OFFICE
CERTIFICATE OF CORRECTION

PATENT NO. : 9,959,885 B2
APPLICATION NO. : 15/366586
DATED : May 1, 2018
INVENTOR(S) : Antonio Henrique Barbosa Postal et al.

Page 1 of 1

It is certified that error appears in the above-identified patent and that said Letters Patent is hereby corrected as shown below:

On the Title Page

Item [71] (Applicant), Line 6:
Delete "ELECTRÔNICA" and insert -- ELETRÔNICA --, therefore.

Item [*] (Notice), Line 19:
After "0 days." delete "days.".

Signed and Sealed this
Twenty-sixth Day of June, 2018

Andrei Iancu
*Director of the United States Patent and Trademark Office*